United States Patent [19]

Baxter et al.

[11] 4,371,680

[45] Feb. 1, 1983

[54] POLYMER COMPOSITION

[75] Inventors: Warren N. Baxter, Orange, Tex.; Nicholas G. Merckling, deceased, late of Wilmington, Del.; by Noelle K. Masukawa, administratrix, Wauwatosa, Wis.; Ivan M. Robinson, Wilmington; Gelu S. Stamatoff, Newark, both of Del.

[73] Assignee: E. I. Du Pont de Nemours & Company, Wilmington, Del.

[21] Appl. No.: 708,718

[22] Filed: Jan. 22, 1968

Related U.S. Application Data

[60] Division of Ser. No. 556,548, Dec. 30, 1955, abandoned, Continuation-in-part of Ser. No. 451,064, Aug. 19, 1954, abandoned, and Ser. No. 517,398, Jun. 22, 1955, abandoned.

[51] Int. Cl.$^3$ .......................... C08F 4/64; C08F 4/68; C08F 210/02
[52] U.S. Cl. .................................. 526/159; 526/169; 526/169.2; 526/348; 526/351
[58] Field of Search ...................... 526/159, 169, 169.2

[56] References Cited

U.S. PATENT DOCUMENTS

| | | | |
|---|---|---|---|
| 2,200,429 | 5/1940 | Perrin et al. | 260/80 |
| 2,396,785 | 3/1946 | Hanford | 260/78 |
| 2,691,647 | 10/1954 | Field et al. | 260/88.2 R |
| 2,731,452 | 1/1956 | Field et al. | 260/88.1 |
| 2,731,453 | 1/1956 | Field et al. | 260/88.1 |
| 2,825,721 | 3/1958 | Hogan et al. | 260/88.1 |
| 3,257,332 | 6/1966 | Ziegler | 252/429 |
| 3,300,459 | 1/1967 | Natta et al. | 260/88.2 |
| 3,833,551 | 9/1974 | Ziegler et al. | 260/88.2 |

Primary Examiner—Edward J. Smith

[57] ABSTRACT

A process is disclosed for the polymerization and interpolymerization of propylene, either alone or in admixture with ethylene, to produce polymers and copolymers of propylene. The catalyst employed is a coordination complex comprising at least some divalent titanium, or other transition metal element in lower valent state. The catalysts are prepared by mixing a higher valent titanium (or other transition metal) halide or titanate ester with a reducing agent, which can be any organometallic compound, such as a metal alkyl or aryl, including Grignard reagents, a metal hydride, or a metal including zinc and metals above zinc in the electromotive series. Hydrocarbon media can be employed advantageously for the preparation of the catalysts and for the polymerizations. The polymeric products (both homopolymers and copolymers) are linear and of high molecular weight and are useful as plastics, fibers and elastomers and for production of blends with polyethylene.

3 Claims, No Drawings

POLYMER COMPOSITION

This application is a division of our copending U.S. application Ser. No. 556,548, filed December 30, 1955, which is a continuation-in-part of our copending application Serial No. 451,064, filed August 19, 1954 and of our application Serial No. 517,398, filed June 22, 1955, all said applications now abandoned.

This invention relates to propylene polymers and interpolymers and to methods for preparing same.

Solid polymers of ethylene have been known for many years and have attained a position of preeminence among olefin polymers in the plastics industry. During the many years which have passed since solid polymers of ethylene became commercially important, efforts have been made repeatedly to produce propylene polymers of high quality. One of the difficulties which has repeatedly thwarted the efforts of those who have sought to make propylene polymers of sufficiently high quality to be of important commercial value, has been the inability to produce a linear polymer having a range of molecular weight which would permit its use in plastics applications. Similarly, efforts to make ethylene-propylene interpolymers have not met with commercial success, primarily because the interpolymers made by the heretofore known processes were relatively low-melting and could not compete satisfactorily with homopolymers of ethylene. This was true even when pressures exceeding 500 atmospheres were employed in the interpolymerization (cf. U.S. Pat. No. 2,200,429). Viscous oily ethylene-propylene interpolymers are disclosed in U.S. Pat. No. 2,405,950. An ethylene-propylene interpolymer which melted at 80°-82° C. and had a melt viscosity of 21.5 at 139° C., was prepared by Brubaker (Example 9 of U.S. Pat. No. 2,396,677; cf. also U.S. Pat. Nos. 2,439,528 and 2,436,256). Propylene homopolymer has been disclosed in U.S. Pat. No. 2,478,066. The nature of the propylene polymer and propylene-ethylene interpolymer, as explained hereinafter, depend upon the method of preparation. The propylene polymers and interpolymers to be described hereinafter are of widely different character and utility from those described in the above-cited art.

It has recently been discovered that a novel and highly active catalyst system, comprising divalent titanium, is highly effective in the polymerization of olefinic compounds. The present application is based upon the further discovery that polypropylene and ethylene-propylene interpolymers prepared by the use of the said catalyst differ in kind from the polymers made by the prior art processes.

The above-mentioned catalyst system can be made by combining divalent titanium with organic compounds containing ethylenic unsaturation. In specific embodiments, it has been found that titanium compounds having a valence state of two, which may be combined with two radicals (suitable examples being alkoxy radicals, alkyl radicals, and radicals which form acids when combined with hydrogen), can be used effectively in the polymerization of propylene. Said divalent titanium is generally obtained by admixing a titanium compound having a valence state in excess of two with a reducing agent. The quantity of reducing agent which is present must be sufficient to convert the titanium at least in part to a valence state of two. Titanium trichloride is ineffective for converting ethylene to solid polymers. On the other hand, titanium dichloride is an effective catalyst for making the polymers of this invention. A test for divalent titanium, which defines the presence or absence thereof, is the ability of the divalent titanium to react with liquid water to form hydrogen. Coordination of the divalent titanium with organic components, etc., does not necessarily destroy its ability as a catalyst nor destroy its ability to produce hydrogen upon reaction with liquid water; in fact, it appears that propylene is capable of coordinating with the divalent titanium in this manner, and quite possibly this phenomenon has a bearing on the mechanism of the polymerization. There is evidence, as explained hereinafter, that compounds which complex preferentially tend to suppress the polymerization reaction. One group of the catalyst compositions of this invention contain titanium at an average valence below 3, and at least some of the titanium, in said embodiment, must be at a valence state of two to produce the extraordinary effects herein reported.

The nature of these coordination complexes is not fully understood, but they are active catalysts or catalyst components which are capable of initiating the polymerization of propylene in an extremely active manner to produce solid propylene polymers which differ from those of the above-cited patents. Furthermore, in particular instances, the organic radical which is combined in the coordination complex may provide end groups for the solid propylene polymer or ethylene-propylene interpolymer. In connection with the characterization of the catalyst, it is of interest to note that a coordination complex prepared from titanium tetrachloride and phenyl magnesium bromide in such proportions as to reduce the average valence of the titanium to below 3 when used as an ethylene polymerization initiator, gives rise to the formation of a solid polymer which appeared, by ultra violet absorption, to contain phenyl groups.

Moreover, it has also been discovered that effective catalysts for polymerization of propylene can be obtained by reduction of compounds of other transition elements, namely Zr, Ce, V, Nb, Ta, Cr, Mo, or W, or any combinations thereof, in a manner analogous with that disclosed herein for compounds of Ti.

It is believed that the coordination complexes hereinabove described are novel compounds which have not been employed heretofore in the polymerization of interpolymerization of propylene. The complexes are difficult to isolate in a pure state, but their presence can be detected from the chemical properties of the mixtures produced when a titanium compound having a valence state above 2 is reduced at least in part to a valence state of 2 and admixed with an ingredient which can form a complex with the titanium in its low state of valence.

So active, as propylene polymerization catalysts, are the coordination complexes hereinabove described that they can be used for polymerizing propylene to solid polymers at room temperature and atmospheric or even substmospheric pressures. These complexes can also be employed in the manufacture of propylene polymers which heretofore have not been obtainable by any polymerization method whatever.

While the polymerization of propylene to produce solid polymers in the presence of the catalysts herein disclosed can be carried out under extremely mild conditions as stated in the preceding paragraph, it is in some instances preferable from an economic standpoint to employ moderately high pressures, suitable from 10 to 200 atmospheres or higher, in order to facilitate the handling of propylene. Much higher pressures, up to several thousand atmospheres, can be employed, but it is not economically desirable to do this in view of the extraordinary activity of the catalysts at lower pressures. Similarly, extremely low temperatures may be employed. The preferred temperatures, however, are within the range of about 0° to 300° C.

The polymerization of propylene according to the process of this invention, takes place most satisfactorily when the polymerization mixture is substantially moisture-free and also free of other sources of hydroxyl groups. Since water reacts with the catalyst, as hereinabove explained, the water content of the mixture should be kept at the lowest practicable minimum. As in numerous other polymerization processes, the polymerization mixture in the process of this invention is preferably kept free of oxygen since oxygen reacts with the catalyst. In practical operations, the oxygen content should preferably be held below 20 parts per million. Certain compounds which are known to be polymerizable and which are capable of coordinating with the titanium at a valence state of 2 form complexes which are too stable for optimum results, and accordingly, the presence of these compounds should preferably (although not necessarily) be avoided. In this category are ketones and esters. Hydrocarbon solvents, on the other hand, can be used quite effectively.

Among the reducing agents which are most effective for reducing the valence of the titanium as hereinabove disclosed, the following may be mentioned:
(1) Grignard reagents.
(2) Metal alkyls or aryls and similar organo-metallic compounds.
(3) Zinc metal and metals above zinc in the electromotive series.
(4) Metal hydrides.

In specific embodiments, the polymerization mixtures especially those employing inert solvents, such as hydrocarbons, are homogeneous and contain the active coordination complex in a dissolved form. These homogeneous catalyst systems have certain advantages over heterogeneous catalyst systems. In the homogeneous systems, the polymerization takes place very readily in the presence of a relatively small amount of the coordination complex. In contrast with this, a somewhat larger quantity of catalyst is necessary if a heterogeneous system is employed especially if the effective surface area of the catalyst is not extremely large. Good results are obtained when the catalyst is colloidally dispersed.

The polypropylene obtained in the practice of this invention is a mixture of amorphous and crystalline polymer. The content of crystalline polymer is relatively small, but is increased by orientation, e.g. by drawing into fibers. In general, the percentage of crystallinity is initially above 0.5% and below 30%. The crystalline habit is evidently triclinic, the fiber axis of the unit cell being 6.54 A°. Measurement of the other two axes makes possible the calculation of cell volume and angles, but the data are rather difficult to interpret quantitatively with complete assurance, hence exact information on cell size and angles is still in some doubt.

The polypropylene of the present invention, as obtained by the methods illustrated in the Examples which follow, has the infra-red absorption spectrum shown in the accompanying drawing, FIG. 1. For comparison, FIG. 2, represents the infra-red absorption spectrum of prior art polypropylene. The interpretation of the infrared data obtained on these respective materials, based on currently accepted assignments for the respective absorbtion bands, is that the polypropylene of FIG. 1 has regular head-to-tail structure, i.e. it is made up substantially entirely of recurring propylene units arranged in regular head-to-tail fashion. In contrast with this, the polypropylene of FIG. 2 has a different chemical structure. In the latter Figure the band of medium intensity at 8.95 microns signifies the existence of methyl groups on each of two vicinal carbon atoms. This band is not present to any substantial extent in the head-to-tail polypropylene of FIG. 1. The band is about 8.69 A° corresponds with a single pendant methyl group between two methylene carbon atoms, and is present in both polymers indicating that they have, at least to some extent, this structural unit in common. The overall assignments for the absorption bands for the polypropylene of this invention (FIG. 1) conform with structures making up the head-to-tail configuration. FIG. 1 includes a series of scans, obtained with different samples at different levels of crystallinity (as determined by x-ray diffraction), using catalysts prepared as hereinafter disclosed. The differences resulting from different percentages of crystalline component are understandable on the basis of structural effects (rotations) other than deviations from the basic head-to-tail structure.

The physical properties of the partially crystalline polypropylene of the present invention vary with the molecular weight and with the molecular weight distribution, i.e. the ratio of weight average molecular weight to number average molecular weight ($M_w/M_n$). In a particular instance, the following physical properties were measured: melt index, 0.17; crystallinity, 15%; tensile strength, 1050 p.s.i.; ultimate strength, 1050 p.s.i.; yield strength, 153 p.s.i.; elongation, 956%; tensile modulus, 856; tensile impact, ft. lbs./in., 323; steady state compliance, 11.2; Newtonion viscosity $2.6 \times 10^6$; $M_w$, estimated from Newtonian viscosity, 210,100; $M_n$, determined by cryoscopy, 14,500; $M_w/M_n$, 14.5. In another instance, melt index was less than 0.01; crystallinity, 22%; tensile strength, 1730 p.s.i.; ultimate strength, 1730 p.s.i.; yield strength 223 p.s.i.; elongation, 944 p.s.i.; tensile modulus 2180 p.s.i.; stiffness 1650 p.s.i.; low temperature brittleness by A.S.T.M. impact test, C°, −11; steady state compliance, 11.2; and Newtonian viscosity, $8.41 \times 10^6$. Tensile creep data, obtained in the form of plots of apparent modulus vs. time, apparent modulus being defined as $$\frac{\text{Initial stress, p.s.i.}}{(\text{length in cm. at time } t \text{ minus initial length in cm.})/\text{initial length, in cm.}}$$

show that the apparent modulus varies from about $10^3$ p.s.i. to 0.1 hour to $10^{2.4}$ at 100 hours in one instance, and in another instance from $10^{2.4}$ p.s.i. at 0.1 hour to $10^2$ p.s.i. at 100 hours. These data are of the same order of magnitude at the corresponding creep data obtained on commercial plasticized polyvinyl chloride. More particularly, the data show that polypropylene has low creep, i.e. its apparent modulus varies with time not faster than $(10^n - 10^{0.7n})$ per 100 hours, where n has any value of about 2 to 3.

The invention is illustrated further by means of the following examples:

EXAMPLE I

The reaction product of 2 grams (0.01 mole) of titanium tetrachloride and 13 ml. of a 3M ethereal solution of phenyl magnesium bromide (0.04 mole) in 200 ml. of cyclohexane was introduced into a 325 ml. shaker tube, 100 grams of propylene added, and the tube pressured to 500 psi of ethylene. The mixture was shaken at 30° C. for 2 hours, filtered, and washed and dried, yielding 12.5 grams of copolymer, having an inherent viscosity of 5.4 (decahydronaphthalene). A film pressed at 200° C., 20,000 psi for 3 minutes had a density of 0.91 (cf. U.S. Pat. No. 2,396,677, was orientable and was qualitatively tougher and more transparent than polyethylene prepared under the same conditions. An infra-red determination of methyl groups showed the presence of 3 $CH_3$/100 C.

By decreasing the amount of propylene introduced into the reaction it was shown to be possible to decrease the value of $CH_3$/100 C and increase the density. Thus 50 grams of propylene gave a copolymer having a density of 0.92, and a methyl content of 2 $CH_3$/100 C. Repeating the experiment again with 25 grams of propylene gave a copolymer having a density of 0.93 and a methyl content of 0.7 $CH_3$/100 C.

EXAMPLE II

Propylene homopolymer was prepared by polymerizing propylene at 75° C., for 120 minutes, under an initial pressure of about 300 psi, in a shaker tube of 330 ml. capacity, in the presence of a solution made by admixing 0.01 mole LiAl(n-hexyl)$_4$ and 0.01 mole $TiCl_4$ in cyclohexane (50 ml.). The polymerization was exothermic, and 45 grams of the homopolymer formed. The polymer was purified by washing with methanol, methanol-HCl, and acetone, then dried at 60°. The polymer had a density of 0.885, a melt index of 0.73; X-ray determination showed the polymer to be 15 to 25% crystalline.

EXAMPLE III

Propylene homopolymer was prepared by simply bubbling propylene into a stirred solution made by mixing 0.1 mole LiAl(n-hexyl)$_4$ with 0.1 mole $TiCl_4$ in 50 ml. cyclohexane at atmospheric pressure. The temperature was initially 25°, but rose to 40° due to the rapid exothermic reaction. The quantity of solid polypropylene formed in 45 minutes time was 10.5 grams. This, after freeing from solvent, had a melt index of 1.3.

EXAMPLE IV

3 Grams of solid catalyst made by admixing $TiCl_4$ with phenyl magnesium bromide in ether followed by drying, was mixed with 50 grams propylene in 100 ml. of cyclohexane and the mixture was kept under autogenous pressure for two hours at 25° (initial temperature, no external heat applied). Removal of the solvent and washing out the catalyst as above described gave 0.5 grams polypropylene, having an inherent viscosity of 1.24, as measured in decahydronaphthalene. Repetition of the experiment with a catalyst made from 0.01 mole tetraethyl titanate and 0.04 mole phenyl magnesium bromide gave 0.3 gram of solid polypropylene.

EXAMPLE V

A catalyst solution, made by admixing 0.02 mole tetrabutyl tin with 0.01 mole $TiCl_4$ in 175 ml. dry cyclohexane was mixed with 20 grams propylene, and the mixture was heated at 97°–100° C., under a pressure of 1000 psi for 60 minutes. The solvent was removed from the resulting polymeric product which was thereupon washed with a mixture of concentrated aqueous hydrochloric acid and acetone, followed by an acetone wash, and drying. The solid polypropylene thus obtained could be pressed into a tough somewhat elastic film at 150° C. The weight of polypropylene obtained was 4.8 grams.

EXAMPLE VI

Under a dry propylene atmosphere at room temperature 0.50 ml of $VCl_4$ (0.0047 mole) was dissolved in 200 ml of dry cyclohexane. To the resulting mixture was added dropwise a solution of LiAl(heptyl)$_4$ (0.0046 mole) in 200 ml. of cyclohexane. After the addition was approximately one-third completed, polymer began to precipitate on the sides of the flask. Four minutes after the addition was completed, the reaction mixture had gelled to such an extent that it was very difficult to stir. The reaction mixture was stirred for a total of fifteen minutes. The reaction was killed with methanol and the mixture was poured into a large excess of methanol. The precipitated polymer was washed three times with methanol in a Waring Blendor then dried overnight in a vacuum oven at 90° C. The yield was 18 grams. The presence of crystallinity in the polymer was established by X-ray analysis.

EXAMPLE VII

Zirconium tetrachloride (0.1 mole) and phenyl magnesium bromide (0.4 mole) were mixed with 400 cc. of cyclohexane at room temperature. The solid precipitate which formed was filtered, dried at room temperature and 1 mm. absolute pressure and thereafter stored under nitrogen until ready for use. A mixture of 5 grams of the dry catalyst and 100 cc. of cyclohexane was introduced into a 325 cc. shaker tube along with 50 grams of propylene. Three identical mixtures were prepared in this manner and where shaken for two hours, the first at −50° C., the second at room temperature, and the third at 100° C. There was only a slight trace of polymer produced in the first tube, approximately 0.1 gram of polymer in the second tube, and slightly less than 0.1 gram in the third tube.

When 0.01 mole of zirconium tetrachloride was used as a catalyst without being reduced by phenyl magnesium bromide, there was not obtained any solid polymer of propylene, but only low molecular weight oils and greases.

EXAMPLE VIII

Propylene gas is bubbled through 500 ml. of cyclohexane to prepare a saturated solution of propylene in cyclohexane. To this solution is added 0.005 mole of lithium aluminum tetradecyl dissolved in 30 ml. of decalin and then 0.005 mole of titanium tetrachloride dissolved in 6 ml. of cyclohexane is added. The temperature rises spontaneously to 40°–50° C. and remains at this temperature during polymerization. The dark brown to black catalyst mixture is stirred for 2 hours while propylene is continuously bubbled through the mixture. The catalyst is killed by adding 60 ml. of isopropanol and the viscous gel is mixed with excess isopropanol to coagulate the polymer and extract the catalyst residues. The polymer is well washed with alcohol to remove all traces of catalyst and dried at 70° C. for 24 hours under vacuum. The yield of polymer is 30 to 35 grams, and the inherent viscosity is 3.2 to 3.5 as measured at 0.1% concentration in decalin (containing 0.20% bis-6,6'-(2-tert. butyl-p-cresylol)methane antioxidant) at 130° C.

EXAMPLE IX

Same as example VIII except that the lithium aluminum tetradecyl is dissolved in tetralin (30 ml.) rather than decalin. The yield of polymer is 25 to 30 grams, and the inherent viscosity is 6.5 to 7.0 measured under the same conditions as in example VIII.

EXAMPLE X

Same as example IX except that 0.005 mole vanadium tetrachloride dissolved in 6 ml. of hexane was used in place of the titanium tetrachloride. The yield of polymer was 8 grams, and the inherent viscosity was 5.45 measured under the same conditions as in example VIII.

EXAMPLE XI

The catalyst was prepared by heating 1 gram of lithium aluminum hydride and 18.4 grams of decene-1 for ½ hour at 130° C. and then for ½ hour at 150° C. This reaction mass was then cooled to 70° and taken up in 173 grams of benzene forming a gray slurry. This was then cooled to 10° and treated with 3.75 grams of titanium tetrachloride, which formed a black suspension containing the catalyst. This was further diluted with 1730 grams of benzene. An equimolecular mixture of ethylene and propylene was then passed into this catalyst suspension with agitation as fast as it was absorbed. The heat of the polymerization maintained a temperature of 45°–52°. Addition of the gas was stopped after about 7 hours when the reaction mass had become quite viscous. The polymer was precipitated by adding an equal volume of methanol and warmed on a steam bath. The methanol was decanted and the polymer was washed with several additional quantities of methanol, then dried by milling on a warm rubber mill. The product was a light gray rubbery material weighing 140 grams. It dissolved in carbon tetrachloride by agitation at room temperature with the exception of about 4% of insoluble material. The polymer recovered from the carbon tetrachloride solution by steam distillation of the carbon tetrachloride had an intrinsic viscosity of 2.17 and contained about 41% of propylene based on an approximate determination of the methyl groups by infra-red analysis.

EXAMPLE XII

Lithium aluminum hydride (15.2 grams) was reacted with 280 grams of decene-1 as in the preceding example and was then taken up in 150 grams of mixed xylenes and then heated at 140°–145° for 3 hours to complete the reaction. This was introduced with 2 gallons of dry thiophene-free benzene into a closed polymerization vessel under an atmosphere of nitrogen, which was then replaced as an equimolecular mixture of ethylene and propylene which was later to be polymerized. The catalyst was then formed by introducing 28.5 grams of titanium tetrachloride over a period of 15 minutes. The polymerization started at once and the ethylene-propylene mixture was passed into the agitated polymerization vessel so as to maintain a pressure slightly greater than atmospheric. After the polymerization had proceeded in this way for about an hour, 5 gallons more of benzene was introduced so as to reduce the viscosity of the reaction mass. The reaction was continued for a total of 5 hours, when the viscosity of the solution became too great for adequate agitation and absorption of the gas. The temperature was maintained between 30° and 55° during the polymerization with slight cooling by means of a water jacket when necessary. The resulting polymer was precipitated with methanol as in the preceding example and was then freed of volatile material by steam distillation and then dried on the warm rubber mill. The rubbery product weighed 1793 grams and was almost completely soluble in benzene. The intrinsic viscosity was 2.66.

Ethylene-propylene interpolymers obtainable by the method of the present invention differ very markedly from ethylene-propylene interpolymers obtained by processes of the prior art. These prior art procedures have not yielded ethylene-propylene interpolymer of molecular weight above 25,000 (inherent viscosities exceeding 1.0). In contrast with this, the present invention very readily produces ethylene-propylene interpolymers having an inherent viscosity greater than 2. The ethylene-propylene interpolymers illustrated in the Examples have molecular weights in the 50,000–100,000 range, as determined from inherent viscosities, Furthermore, the process of the present invention is highly effective with respect to both ethylene and propylene as monomer, i.e. the interpolymers are not necessarily of low propylene content, as in other processes. This is an important advantage of the process of the present invention because it permits the production of interpolymers which have the optimum amount of short chain branching for certain uses, such as in the manufacture of vulcanizable elastomers having substituent functional groups, or in the production of squeeze bottles, tubing, flexible sheets, etc.

The polypropylene which is obtained in the practice of this invention differs from that obtainable by prior art processes employing previously known Friedel Crafts catalysts such as ethyl chloride - $AlCl_3$. Polymers obtained from propylene by the use of the latter catalysts reportedly have the properties of tree-branched alkylation products having an extremely broad range of molecular weight; they have methyl groups on adjacent carbon atoms, as determined by infra-red analysis; and they do not resemble the products of this invention structurally or in many useful properties. The polypropylenes of this invention have substantially all of the propylene units linearly arranged in head-to-tail formation, as the main polymer chain. This has been established by infrared analysis, as hereinabove illustrated.

A highly useful and novel polymer obtained in accord with the present invention is polypropylene of low crystallinity but high molecular weight, as above exemplified.

By subjecting this partially crystalline polypropylene to extraction with ether, followed by evaporation of the ether, high molecular weight polypropylene having a density of 0.85 is obtained. Extraction of partially crystalline polypropylene (25% crystallinity) in a Soxhlet apparatus for prolonged periods of time with heptane followed by recovery of heptane from the extract results in isolation of a product which has a somewhat lower percentage of crystallinity (15% than the whole polymer, and which has the properties of an elastomer. This latter material when once stretched, is converted to a rubber-like product which has excellent snap. In this form it is very tough and is virtually non-cold-drawable. These products have crystallinities which do not exceed about 15 to 25%.

A common characteristic of the crystalline or partially crystalline polypropylenes is their crystalline melting point, namely 165° C. (polarized microscope method), the melting point being about 5° lower if a polymeric contaminant such as polyethylene (which evidently has a disturbing effect on the order which is characteristic of crystalline polypropylene) is present.

The density of polypropylene varies with percentage crystallinity from 0.85 for the 100% amorphous material to about 0.94 for 100% crystalline material. The useful properties of the partially crystalline polypropylene also vary with the content of the crystalline component. Highly crystalline polypropylene, while excellent for certain uses as hereinabove indicated, is generally not preferred for certain other uses, where limp tough film is required (for example in shower curtains). Where a combination of limpness and toughness is essential the percentage crystallinity should be less than about 25%. The latter products closely resemble plasticized polyvinyl chloride in stiffness, and brittleness temperature, but have a density of about 0.85 to 0.885, as compared with 1.20 to 1.25 for polyvinyl chloride.

Crystalline fibers of polypropylene can be prepared by press melt spinning of as-prepared polymer and drawing these fibers 3.4–4.5 X in boiling water or a steam tube (too tacky for smooth hot pin drawing). Properties of the fibers are shown in the following Table:

fects may also play a part in this. On the other hand, large organic groups may be attached to the titanium with beneficial results when such groups impart solubility to the catalyst.

The quantity of catalyst employed can be varied over a rather wide range. It is desirable to employ a quantity of catalyst which is at least large enough to produce a reasonably rapid rate for a reasonably long period of time. Suitably, the preferred quantity is within the range of 0.1 to 10% based on the weight of transition element per unit weight monomer.

The polymers which are made under the conditions hereinabove described frequently have such tremendously high molecular weights that removal of catalyst by dissolving and filtering is extremely difficult. The best procedure for obtaining the polymer in a clean form is to wash with acetone-hydrochloric mixture in a Waring Blendor several times followed by washing with acetone and thereafter, if necessary, followed by several acetone-aqueous sodium hydroxide washes and finally by acetone-water wash. Finally, the polymer can be washed with acetone. The products thus obtained are generally snow-white. While this procedure is highly satisfactory for preparing clean polymer, it is to be understood that simpler procedures, such as treatment with water at elevated temperatures, will be entirely suitable for various practical applications. For other practical applications it is not essential to remove

| | Inherent Viscosity | Ratio | Temperature | Method | Extraction Treatment | Tenacity grams per denier | Elongation % | Initial Modulus | Denier | Work Recovery from 3% Elongat'n. | Tensile Recovery from 5% Elongat'n. | Fiber Stick Temp. | % Shrinkage |
|---|---|---|---|---|---|---|---|---|---|---|---|---|---|
| (1) | 3.40 | 4.5× | 100° C. | Steam Tube | None | 1.9 | 53 | 5.4 | 68 | 51 | 76 | 115° | 45 |
| (2) | 5.9 | 3.5× | 100° C. | Boiling H₂O | None | 1.3 | 48 | — | 84 | — | — | 114° | 63 |

TABLE OF PARTIALLY CRYSTALLINE (TRICLINIC) POLYPROPYLENE FIBER PROPERTIES*
DRAWING PERFORMANCE

*All properties are on fibers which were not relaxed.

It is to be understood that, in preparing the catalyst employed in the foregoing examples, a reaction occurs between the halide of the transition element and the Grignard reagent or metal alkyl. The reaction includes reduction of the transition element, coupled in certain instances with a metathetical interchange of groups.

It is to be observed that the foregoing examples are illustrative only and that numerous embodiments of the invention will occur to those who are skilled in the art.

As hereinabove indicated, the reducing component of the polymerization mixture can be varied rather widely, but it is essential that the reducing component be a sufficiently strong reducing agent and also that it be employed in sufficient quantity to reduce the valence of the titanium, at least in part, to 2 (when the transition element is titanium).

The products obtained by polymerizing propylene with catalysts hereinabove disclosed are solid polymers exclusively and are not contaminated with Friedel-Crafts type of oily polymers.

The activity of the catalyst depends in part upon the nature of the groups which are attached to the transition element. It is quite possible that this effect depends upon the varying degrees of shielding around the cation, i.e. the shielding power of the groups attached to titanium influences the activity of the catalyst by influencing the tendency of the titanium to coordinate. Electrical eftraces of catalyst.

The propylene polymers and ethylene/propylene interpolymers obtained in accordance with the process of this invention are highly valuable in numerous applications especially in the form of fibers, films, molded articles, extruded insulation on wire, etc. The presence of methyl side chains in controllable amounts is desirable where a controllable rubberiness is desired in the polymer. In ordinary plastics applications, it is sometimes desirable to admix the polypropylene or ethylene/propylene interpolymer with polyethylene, or in elastomer applications to admix with vulcanizable elastomers, such as butadiene-isobutylene interpolymer. Fillers may be employed to increase stiffness, suitable fillers being finely divided carbon, molybdenum sulfide, finely divided silica, etc. In those embodiments in which the catalyst is not removed from the polymeric product or is only incompletely removed, the products are thermally stable, somewhat surprisingly. When the polymerization is carried out in a system in which the catalyst is dissolved in the inert medium (e.g. when the titanate ester contains octyl groups or other similar groups or when it contains methyl groups but the reducing agent contains phenyl, octyl, or other similar group which can interchange with methyl) the polymer precipitates from the polymerization mixture in a form which may contain measurable amounts of titanium, e.g. as much as 0.5%. Such compositions are highly useful despite their content of tianium. In fact, one of the characteristic properties of these polymers is their content of a detectable amount of titanium in the ash which is producible from such polymers.

The exact constitution of the catalysts obtained as herein described is not necessarily understood in complete detail. It is recognized, however, that the divalent titanium is capable of forming complexes as above described. It is also recognized that alkyl and aryl, or other hydrocarbon groups, can, by metathetical reactions, become attached to the transition element by primary valence bonds in either the divalent or trivalent state. Alternatively, such hydrocarbon groups can be initially attached to the transition element, prior to the reduction. Whether or not any of these chemical phenomena are closely associated with the mechanism of the polymerization is not necessarily known, and the invention is not in any way limited by any theory as to the mechanism of the polymerization reaction.

The polymers of this invention have a linear structure, and as hereinabove indicated are generally partially crystalline. They have inherent viscosities (measured in decahydronaphthalene) which exceed one. The nature of the polymers is determined by the character of the catalyst, and in preferred embodiments the polymer is entirely free from the different type of polypropylene known in the art, namely that which is formed in the presence of free-radical or ionic catalysts. Insofar as the components of the catalyst can generate free radicals, this other variety of polymer can be present, but this can be avoided, if desired, by preparing the catalyst (and even isolating it in solid form and storing it in an oxygen-free atmosphere) prior to use, rather than forming it in situ. With such precautions taken to avoid the presence of polymer formed via known sources of free radicals, polymer of optimum quality, from the standpoint of many useful properties, is obtained. Moreover, such precautions are generally unnecessary.

The polypropylene of this invention is useful in the form of blends with high density (e.g., 0.96) polyethylene. These blends can be made by dissolving the individual homopolymers in a common solvent, followed by precipitation of the blend or removal of the solvent. They can also be made by milling these polymers together. For example, ninety parts by weight of polyethylene having a density of 0.96 was mill-blended with 10 parts by weight of solid polypropylene. The resulting blend was converted to a film by heating for 1 minute under a pressure of 20,000 psi at 200° C., followed by 10 minutes at 105° C. The resulting film had a stiffness of 125,000 psi. Certain of the properties of high density polyethylene-polypropylene blends vary in almost straight line relationship with the percentage of polypropylene. Others vary only slightly with polypropylene content up to a certain percentage of that component, and change more rapidly as the content of polypropylene is further increased. For example, the impact strength of the blends varies very little with increase in polypropylene content up to a polypropylene content of about 40%, but as the polypropylene content is further increased the impact strength increases quite rapidly. For high impact strength, the polypropylene content is therefore at least 40% of the weight of the blend. The blends containing more than about 95% of polypropylene do not differ very markedly from unblended polypropylene. There is virtually no change in tensile strength, for example, in raising the polypropylene content from 95% to 100%. In fact, the tensile strength varies with polypropylene content according to a straight line relationship up to a polypropylene content of about 40%, at which point the yield stress approximately equals the ultimate strength, and with further increase in polypropylene content there is relatively little further lowering of the ultimate strength.

The useful range of melt index for many applications is about 0.005 to 5.0. At a melt index this range the blends are too intractable to be shaped by conventional methods, while at a melt index above 5.0, the blends are too brittle. Between these two extremes the optimum range of melt index is about 0.2 to 1.8. One way by which it is possible to obtain a blend having a melt index within any desired range is to use homopolymers which each have melt indices within said range. Melt index is measured by the method described in ASTM 1238-52T.

We claim:

1. A process which comprises interpolymerizing monomers comprising ethylene and propylene in the presence of a polymerization catalyst formed by mixing an organometal compound consisting of a metal alkyl or metal aryl of a metal selected from the group consisting of metals of Groups II and III of the Periodic System; zinc metal or metals above zinc in the electromotive series with a compound, other than the oxide, of a metal selected from the group consisting of titanium, zirconium, vanadium, tantalum, chromium, molybdenum, and tungsten, and recovering the solid polymer formed.

2. Process according to claim 1 in which said organometal compound is an organo-aluminum compound.

3. A process according to claim 1 in which the polymerization catalyst is formed from a compound, other than the oxide, of titanium.

* * * * *